US 6,673,274 B2

United States Patent
Venigalla et al.

(10) Patent No.: US 6,673,274 B2
(45) Date of Patent: Jan. 6, 2004

(54) DIELECTRIC COMPOSITIONS AND METHODS TO FORM THE SAME

(75) Inventors: Sridhar Venigalla, Macungie, PA (US); Dorran L. Schultz, Schwenksville, PA (US)

(73) Assignee: Cabot Corporation, Boston, MA (US)

( * ) Notice: Subject to any disclaimer, the term of this patent is extended or adjusted under 35 U.S.C. 154(b) by 68 days.

(21) Appl. No.: 09/833,751

(22) Filed: Apr. 11, 2001

(65) Prior Publication Data

US 2002/0171066 A1 Nov. 21, 2002

(51) Int. Cl.[7] .................................................. H01B 3/24
(52) U.S. Cl. .................... 252/570; 252/572; 252/573; 361/321.4; 361/321.1; 361/321.2; 361/321.3; 361/311; 361/312
(58) Field of Search ............................ 252/570, 572, 252/573; 361/321.4, 321.1, 321.2, 321.3, 312, 311

(56) References Cited

U.S. PATENT DOCUMENTS

| | | |
|---|---|---|
| 3,490,927 A | 1/1970 | Kahn et al. |
| 3,642,527 A | 2/1972 | Purdes et al. |
| 3,717,487 A | 2/1973 | Hurley et al. |
| 3,725,539 A | 4/1973 | Spangenberg |
| 3,754,987 A | 8/1973 | Purdes |
| 4,283,753 A | 8/1981 | Burn |
| 4,636,248 A | 1/1987 | Ogata et al. |
| 4,636,378 A | 1/1987 | Pastor et al. |
| 4,643,984 A | 2/1987 | Abe et al. |
| 4,755,493 A | 7/1988 | Takeuchi et al. |
| 4,764,493 A | 8/1988 | Lilley et al. |
| 4,829,033 A | 5/1989 | Menashi et al. |
| 4,832,939 A | 5/1989 | Menashi et al. |
| 4,855,266 A | 8/1989 | Burn |
| 4,859,448 A | 8/1989 | Klee et al. |
| 4,863,883 A | 9/1989 | Menashi et al. |
| 4,880,757 A | 11/1989 | Henslee et al. |
| 4,880,758 A | 11/1989 | Heistand, II et al. |
| 4,886,654 A | 12/1989 | Ohga et al. |
| 4,898,843 A | 2/1990 | Matushita et al. |
| 4,937,213 A | 6/1990 | Bernier et al. |
| 4,939,108 A | 7/1990 | Dean |
| 4,987,107 A | 1/1991 | Narumi et al. |
| 5,011,804 A | 4/1991 | Bergna et al. |
| 5,029,042 A | 7/1991 | Dean |
| 5,082,810 A | 1/1992 | Bergna et al. |
| 5,082,811 A | 1/1992 | Bruno |
| 5,084,424 A | 1/1992 | Abe et al. |

(List continued on next page.)

FOREIGN PATENT DOCUMENTS

| | | |
|---|---|---|
| DE | 195 46 237 A | 6/1997 |
| JP | 5058605 | 9/1993 |
| WO | WO 93/16012 A1 | 8/1993 |
| WO | WO 96/06811 A2 | 3/1996 |
| WO | WO 98/35920 A1 | 8/1998 |

OTHER PUBLICATIONS

D.A. Payne et al., "Inhibition of Grain Growth in Barium Titanate", J. Am. Ceram. Soc., p. 491, Sep. 1967.

(List continued on next page.)

*Primary Examiner*—Yogendra N. Gupta
*Assistant Examiner*—Derrick G Hamlin

(57) ABSTRACT

The invention provides dielectric compositions and methods of forming the same. The dielectric compositions may be used to form dielectric layers in electronic devices such as multilayer ceramic capacitors (MLCCs) and, in particular, MLCCs which include base metal electrodes. The dielectric compositions include a barium titanate-based material and several dopants. The type and concentration of each dopant is selected to provide the dielectric composition with desirable electrical properties including a stable capacitance over a temperature range, a low dissipation factor, and a high capacitance. Preferably, MLCCs including dielectric layers formed with the composition satisfy X7R and/or X5R requirements.

43 Claims, 1 Drawing Sheet

U.S. PATENT DOCUMENTS

| | | |
|---|---|---|
| 5,086,021 A | 2/1992 | Sasaki et al. |
| 5,087,437 A | 2/1992 | Bruno et al. |
| 5,096,642 A | 3/1992 | Shirasaki |
| 5,112,433 A | 5/1992 | Dawson et al. |
| 5,155,072 A | 10/1992 | Bruno et al. |
| 5,225,960 A | 7/1993 | Kishi et al. |
| 5,296,426 A | 3/1994 | Burn |
| 5,335,139 A | 8/1994 | Nomura et al. |
| 5,362,472 A | 11/1994 | Lauter et al. |
| 5,403,797 A | 4/1995 | Ohtani et al. |
| 5,445,806 A | 8/1995 | Kinugasa et al. |
| 5,453,262 A | 9/1995 | Dawson et al. |
| 5,590,387 A | 12/1996 | Schmidt et al. |
| 5,650,367 A | 7/1997 | Fujikawa et al. |
| 5,668,694 A | 9/1997 | Sato et al. |
| 5,690,727 A | 11/1997 | Azuma et al. |
| 5,734,545 A | 3/1998 | Sano et al. |
| 5,742,473 A | 4/1998 | Sano et al. |
| 5,757,610 A | 5/1998 | Wada et al. |
| 5,790,367 A | 8/1998 | Mateika et al. |
| 5,835,340 A | 11/1998 | Wada et al. |
| 5,841,626 A | 11/1998 | Sano et al. |
| 5,862,034 A | 1/1999 | Sato et al. |
| 5,877,934 A | 3/1999 | Sano et al. |
| 5,977,006 A | 11/1999 | Iguchi et al. |
| 5,995,360 A | 11/1999 | Hata et al. |
| 6,002,577 A | 12/1999 | Wada et al. |
| 6,007,870 A | 12/1999 | Kono et al. |
| 6,087,287 A | 7/2000 | Iguchi et al. |
| 6,088,216 A * | 7/2000 | Laibowitz et al. ....... 361/321.4 |
| 6,108,192 A | 8/2000 | Sugimoto et al. |
| 6,129,903 A | 10/2000 | Kerchner |
| 6,205,014 B1 | 3/2001 | Inomata et al. |
| 6,205,015 B1 | 3/2001 | Wada et al. |
| 6,214,756 B1 | 4/2001 | Adair et al. |
| 6,268,054 B1 | 7/2001 | Costantino et al. |
| 6,284,216 B1 | 9/2001 | Sakai et al. |
| 2002/0016247 A1 | 2/2002 | Muzuno et al. |

OTHER PUBLICATIONS

S.A. Bruno et al., "High Performance Multilayer Capacitor Dielectrics from Chemically Prepared Powders", J. Am. Ceram. Soc. 76:1233–1241, May 1993.

T.M. Harkulich et al., "Ferroelectrics of Ultrafine Particle Size: II, Grain Growth Inhibition Studies", J. Am. Ceram. Soc., 49:295–299, Jun. 1966.

W. Hertl, "Kinetics of Barium Titanate Synthesis", J. Am. Ceram. Soc., 71:879–883, Oct. 1988.

M. Kahn, "Preparation of Small–Grained and Large–Grained Ceramics from Nb–Doped $BaTiO_3$", J. Am. Ceram. Soc., 54:452–454, Sep. 1971.

H. Kumazawa et al., "Preparation of Barium Titanate Ultrafine Particles from Amorphous Titania by a Hydrothermal Method and Specific Dielectric Constants of Sintered Discs of the Prepared Particles", J. Mat. Science, 31:2599–2602, 1996.

T.R.N. Kutty et al., "Precipitation of Rutile and Anatase ($TiO_2$) Fine Powders and Their Conversion of $MtiO_3$ (M=Ba, Sr, Ca) By the Hydrothermal Method", Mat. Chem. and Physics, 19:533–546, 1988.

S. Wada et al., "Preparation of Barium Titanate Fine Particles by Hydrothermal Method and Their Characterization", J. Ceram. Soc. of Japan, 103:1220–1227, 1995.

* cited by examiner

DIELECTRIC COMPOSITIONS AND METHODS TO FORM THE SAME

FIELD OF INVENTION

The invention relates generally to dielectric materials and, more particularly, to barium titanate-based compositions that may be used to form dielectric layers in an electronic device such as a multilayer ceramic capacitor.

BACKGROUND OF INVENTION

Barium titanate-based compositions, which include barium titanate ($BaTiO_3$) and its solid solutions, may be used to form dielectric layers in electronic devices such as multilayer ceramic capacitors (MLCCs). The barium titanate-based compositions are typically produced as small particles (e.g., about 1 micron or less) which may be further processed to form a dielectric layer. MLCCs include a series of alternating dielectric and electrode layers which are stacked to form a laminate structure. Certain types of MLCCs utilize nickel-based electrodes. Nickel-based electrodes may provide cost savings over precious metal-based electrodes (e.g., Pd, Ag—Pd).

Industry standards exist to qualify the performance of MLCC devices. For example, an MLCC is required to have certain electrical and mechanical properties to achieve X7R specifications or X5R specifications. The X7R specification has a temperature stability requirement (a capacitance at −55° C. and at 125° C. that varies less than +/−15% from the capacitance at 25° C.) and a dissipation factor requirement (less than 3.5% at 1.0 Vrms). The X5R specification has a temperature stability requirement (a capacitance at −55° C. and at 85° C. that varies less than +/−15% from the capacitance at 25° C.) and a dissipation factor requirement (less than 5.0% at 1.0 Vrms).

Pure barium titanate ($BaTiO_3$) undergoes several phase transformations over the temperature range of −55° C. and 125° C. which can cause a change in capacitance. For example, the tetragonal-cubic transformation that occurs near 125° C. typically causes an anomalous increase in capacitance on the order of 300–500% the value of the dielectric constant at 25° C. Thus, pure barium titanate generally cannot be used to form dielectric layers in MLCCs that satisfy the X7R or X5R specifications.

Dopants may be added to pure barium titanate in order to improve certain electrical properties of MLCCs including increasing temperature stability and decreasing dielectric loss. Typically, the dopants are metallic compounds, often in the form of oxides or hydroxides. With the addition of dopants, it is possible to form compositions which can form dielectric layers of MLCCs that satisfy the X7R or X5R requirements. However, sometimes, such compositions can have other disadvantages such as a relatively low capacitance and/or high dielectric loss which can sacrifice the performance of MLCCs which include dielectric layers formed from the compositions.

SUMMARY OF INVENTION

The invention provides dielectric compositions, methods of forming the same, and capacitors that include dielectric layers formed from the dielectric compositions.

In one aspect the invention provides a dielectric composition. The dielectric composition comprises a barium titanate-based material, a rare earth metal compound, a manganese compound, an alkaline earth metal compound, a hexavalent metal compound, and a silicate-based compound.

In another aspect, the invention provides a dielectric composition. The dielectric composition comprises barium titanate, yttrium which comprises between about 0.10% and about 2.5% of the total weight of the dielectric composition, manganese which comprises between about 0.01% and about 0.20% of the total weight of the dielectric composition, magnesium which comprises between about 0.01% and about 0.50% of the total weight of the dielectric composition, molybdenum which comprises between about 0.01% and about 0.20% of the total weight of the dielectric composition, and barium silicate which comprises between about 0.50% and about 5.0% of the total weight of the dielectric composition.

In another aspect, the invention provides a dielectric composition. The dielectric composition comprises barium titanate-based particles. The barium titanate-based particles have a coating comprising a rare earth metal compound, a manganese compound, an alkaline earth metal compound, a hexavalent metal compound, and a silicate-based compound.

In another aspect, the invention provides a capacitor. The capacitor includes at least one electrode layer and at least one dielectric layer. The dielectric layer comprises a barium titanate-based material, a rare earth metal compound, a manganese compound, an alkaline earth metal compound, a hexavalent metal compound, and a silicate-based compound.

In another aspect, the invention provides at least one electrode layer and at least one dielectric layer. The dielectric layer comprises a dielectric composition. The dielectric composition comprises the dielectric composition comprises barium titanate, ytrium, manganese, magnesium, molybdenum, and barium silicate. Yttrium comprises between about 0.10% and about 2.5% of the total weight of the dielectric composition. Manganese comprises between about 0.01% and about 0.20% of the total weight of the dielectric composition. Magnesium comprises between about 0.01% and about 0.50% of the total weight of the dielectric composition. Molybdenum comprises between about 0.01% and about 0.20% of the total weight of the dielectric composition. Barium silicate comprises between about 0.50% and about 5.0% of the total weight of the dielectric composition.

In another aspect, the invention provides a method of forming a dielectric composition. The method includes forming a coating on barium titanate-based particles. The coating comprises a rare earth metal compound, a manganese compound, an alkaline earth metal compound, a hexavalent metal compound, and a silicate-based compound.

Other advantages, novel features, and aspects of the invention will become apparent from the following detailed description of the invention when considered in conjunction with the accompanying figures, and from the claims.

DETAILED DESCRIPTION

Figure 1:
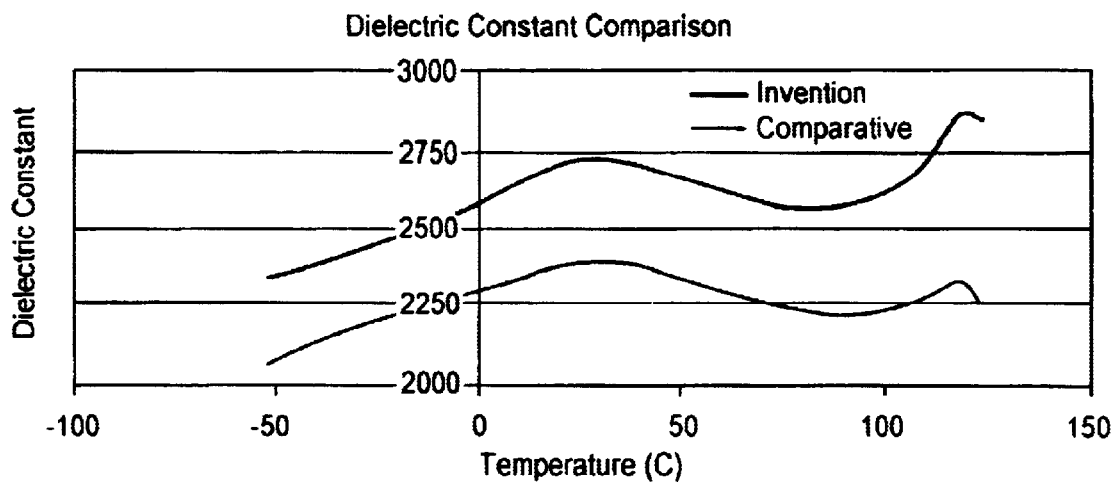
FIG. 1 is a graph comparing the dielectric constant of a dielectric composition according to one embodiment of the present invention to a comparative dielectric composition.

The invention provides dielectric compositions and methods of forming the same. The dielectric compositions may be used to form dielectric layers in electronic devices such as MLCCs and, in particular, MLCCs which include base metal electrodes. The dielectric compositions include a barium titanate-based material and several dopants. As described further below, the type and concentration of each dopant is selected to provide the dielectric composition with desirable electrical properties including a stable capacitance over a temperature range, a low dissipation factor, and a high capacitance. Preferably, MLCCs including dielectric layers formed with the composition satisfy X7R and/or X5R requirements.

The dielectric composition includes a barium titanate-based material. As described further below, the barium titanate-based material is the major component (i.e., the component having the highest weight percentage in the composition) of the dielectric composition. For example, the concentration of barium titanate-based material is generally greater than about 90% of the total weight of the composition. In some cases, the concentration of barium titanate-based material is greater than 95% of the total weight of the composition.

As used herein, "barium titanate-based materials" refer to barium titanate, solid solutions thereof, or other oxides based on barium and titanium having the general structure $ABO_3$, where A represents one or more divalent metals such as barium, calcium, lead, strontium, magnesium and zinc and B represents one or more tetravalent metals such as titanium, tin, zirconium, and hafnium. One type of barium titanate-based material has the structure $Ba_{(1-x)A_x}Ti_{(1-y)}B_yO_3$, where x and y can be in the range of 0 to 1, where A represents one or more divalent metal other than barium such as lead, calcium, strontium, magnesium and zinc and B represents one or more tetravalent metals other than titanium such as tin, zirconium and hafnium. Where the divalent or tetravalent metals are present as impurities, the value of x and y may be small, for example less than 0.1. In other cases, the divalent or tetravalent metals may be introduced at higher levels to provide a significantly identifiable compound such as barium-calcium titanate, barium-strontium titanate, barium titanate-zirconate, and the like. In still other cases, where x or y is 1.0, barium or titanium may be completely replaced by the alternative metal of appropriate valence to provide a compound such as lead titanate or barium zirconate. In other cases, the compound may have multiple partial substitutions of barium or titanium. An example of such a multiple partial substituted composition is represented by the structural formula $Ba_{(1-x-x'-x'')}Pb_xCa_{x'}Sr_{x''}O.Ti_{(1-y-y'-y'')}Sn_yZr_{y'}Hf_{y''}O_2$, where x, x', x'', y, y', and y'' are each greater than or equal to 0. In many cases, the barium titanate-based material will have a perovskite crystal structure, though in other cases it may not. In some embodiments, pure barium titanate ($BaTiO_3$) may be preferred. In some cases, the dielectric composition may include a mixture of more than one type of barium titanate-based material.

The barium titanate-based material is typically provided in particulate form. The barium titanate-based particles may have a variety of different particle characteristics. The barium titanate-based particles typically have an average primary particle size of less than about 1.0 micron; in some cases, the average primary particle size may be less than about 0.5 micron; most preferably, the average primary particle size is less than about 0.1 micron. The average primary particle size may be determined by conventional techniques such as scanning electron microscopy (SEM) analysis. The particular particle size depends in part on the requirements of the application such as the desired layer thickness and electrical properties. Smaller particle sizes may be desired, for example, to form thinner dielectric layers.

In some embodiments, the barium titanate-based particles may agglomerate and/or aggregate to form aggregates and/or agglomerates of aggregates. At times, it may be preferable to use barium titanate-based particles that are not strongly agglomerated and/or aggregated such that the particles may be relatively easily dispersed, for example, by high shear mixing. Suitable barium titanate-based particles are described in commonly-owned, co-pending U.S. patent application Ser. No. 08/923,680, entitled "Dispersible, Metal Oxide Coated, Barium Titanate Materials," filed Sep. 4, 1997, which is incorporated herein by reference in its entirety.

The barium titanate-based particles may also have a variety of shapes which may depend, in part, upon the process used to produce the particles. For example, the barium titanate-based particles may be equiaxed and/or substantially spherical. Substantially spherical particles may be preferred in certain cases, in part, because the substantially spherical shape allows a large number of particles to be packed into a given volume. In other cases, barium titanate-based particles may have an irregular, non-equiaxed shape.

The barium titanate-based particles may be produced according to any technique known in the art including hydrothermal processes, solid-state reaction processes, sol-gel processes, as well as precipitation and subsequent calcination processes, such as oxalate-based processes. In some embodiments, particularly when substantially spherical particles, it may be preferable to produce the particles using a hydrothermal process. Suitable hydrothermal processes for forming barium titanate-based particles have been described, for example, in commonly-owned U.S. Pat. Nos. 4,829,033, 4,832,939, and 4,863,883, which are incorporated herein by reference in their entireties.

In some cases, it is preferable to use heat-treated barium titanate-based particles in the dielectric composition. Heat treatment can increase the average particle size which can increase electrical properties such as the dielectric constant and capacitance. Suitable heat treatment processes are described, for example, in commonly-owned, co-pending U.S. patent application Ser. No 09/689,093, entitled "Production of Dielectric Particles," filed on Oct. 12, 2000, which is incorporated herein by reference in its entirety.

In addition to the barium titanate-based material, the dielectric composition also includes a variety of dopants. The dopants are typically metallic compounds which, for example, can be metal oxides, metal hydroxides, or metal hydrous oxides. The composition of the dopant compound may depend, in part, on the form (e.g., particle or coating) in which the dopant is provided, as described further below. Individual dopants may be added within preferred concentration ranges to enhance particular properties of the dielectric composition. The combination of dopants is selected so as to provide the dielectric composition with the desired properties.

The dielectric composition may include a first dopant that increases the composition's resistance to reduction. Such reduction can cause the composition to become conductive and lose its ability to function as a dielectric. The dopant can decrease the tendency of the dielectric composition from being reduced, for example, when fired in a reducing atmosphere (e.g., $H_2/H_2O/Ar$) which is used when processing MLCCs that include base metal electrodes. Suitable dopants for increasing reduction resistance are compounds that include rare earth metals such as yttrium (Y), holmium (Ho), dysprosium (Dy), cerium (Ce), and samarium (Sm). The compounds may be, for example, rare earth metal oxides, hydroxides or hydrous oxides. In certain embodiments, yttrium compounds (e.g., $Y_2O_3$ or $Y_2O_3.H_2O$) are the preferred dopant because of availability and cost, amongst other reasons.

The concentration of the first dopant (e.g., rare earth metal compounds) in the composition generally sufficiently limits the reduction of the composition during firing. In some preferred embodiments, the concentration of the rare earth metal element (not compound) in the composition is between about 0.10% and about 2.5% of the total weight of the composition; and, in other embodiments, the concentration of the rare earth metal element (not compound) in the composition is between about 0.50% and about 1.5% of the total weight of the composition. In some preferred embodiments, the concentration of the rare earth metal element in the dielectric composition is about 0.80% of the total weight of the composition. Such weight percentages are particularly preferred when the rare earth metal element is yttrium.

The dielectric composition may also include a second dopant that lowers the dissipation factor (i.e., dielectric loss) of the composition. Suitable dopants for lowering the dissipation factor are manganese compounds such as $Mn_2O_3$ or $Mn(OH)_2$. Manganese compounds also improve the insulating properties of the composition by reducing its conductivity.

The concentration of the manganese compound is generally sufficient to lower the dissipation factor as desired. In some preferred embodiments, the concentration of manganese element (not compound) in the composition is between about 0.01% and about 0.20% of the total weight of the composition; and, in other embodiments, between about 0.02% and about 0.10% of the total weight of the composition. In some preferred embodiments, the concentration of manganese element in the composition is about 0.05% of the total weight of the composition.

The dielectric composition may also include a third dopant that improves the stability of the capacitance at low temperatures (e.g., −55° C.). Suitable dopants for improving the stability of the capacitance are compounds that include alkaline earth metals such as magnesium (Mg), calcium (Ca), strontium (Sr), and barium (Ba). The compounds may be, for example, alkaline earth metal oxides, hydroxides or hydrous oxides. Magnesium compounds (e.g., $Mg_2O_3$ or $Mg(OH)_2$) are preferred in some embodiments because magnesium may increase the dielectric constant of the composition to a greater extent than other alkaline earth metals, amongst other reasons. Atoms of such alkaline earth metals can also advantageously replace divalent metal atoms (e.g., Ba) in the barium titanate-based material to maintain the overall atomic structure during sintering of the composition.

The concentration of the third dopant (e.g., alkaline earth metal compound) in the composition is generally sufficient to obtain the desired capacitance stability at low temperatures. In some preferred embodiments, the concentration of the alkaline earth metal element (not compound) in the composition is between about 0.01% and about 0.50% of the total weight of the composition; and, in some cases, between about 0.05% and about 0.20% of the total weight of the composition. In some preferred embodiments, the concentration of the alkaline earth metal element in the composition is about 0.10% of the total weight of the composition. Such weight percentages are particularly preferred when the alkaline earth metal is magnesium.

In certain cases, it may be preferable for the first dopant (e.g., rare earth metal compound) and the third dopant (e.g., alkaline earth metal compound) to be present in amounts such that the atomic ratio of the rare earth metal to the alkaline earth metal is between about 1.0 and about 4.0 (e.g., 2.0). Such a ratio is beneficial to maintaining the overall atomic structure of the composition during firing, and obtaining a desired Tc at high temperatures (e.g., 85° C. or 125° C.)

In some embodiments, the composition also includes a fourth dopant which helps to limit the formation of atomic defects in the composition which may arise as a result of diffusion during sintering. Lowering the formation of defects can increase the resistance of the dielectric composition to reduction, amongst other benefits. Suitable dopants are compounds that include hexavalent (i.e., 6+) metals such as molybdenum (Mo), chromium (Cr), tungsten (W), neodymium (Nd), and niobium (Nb). In some cases, more than one hexavalent metal compound may be added. The compounds may be, for example, hexavalent metal oxides, hydroxides or hydrous oxides. In some cases, molybdenum compounds are preferred including molybdenum oxide ($MoO_3$). Hexavalent metal compounds may also increase the insulating properties of the composition by lowering the conductivity.

The composition generally includes the fourth dopant (e.g., hexavalent metal compounds including combinations thereof) in a concentration sufficient to control defect formation. In some preferred embodiments, the concentration of the hexavalent metal element(s) (not compound) in the composition is between about 0.01% and about 0.20% of the total weight of the composition; and, in some cases, between about 0.05% and about 0.15% of the total weight of the composition. In some preferred embodiments, the concentration of the hexavalent metal element(s) in the composition is about 0.05% of the total weight of the composition. Such weight percentages are particularly preferred when the hexavalent element is molybdenum.

In some embodiments, the dielectric composition also includes a fifth dopant that functions as a sintering aid that reduces the sintering temperature. Suitable dopants include silicate-based compounds such as barium silicate ($BaSiO_3$), barium calcium silicate ($Ba_xCa_{(1-x)}SiO_3$), amongst others. Suitable silicate-based compounds have been described, for example, in commonly-owned, co-pending U.S. patent application Ser. No. 09/640,498, entitled "Silicate-Based Sintering Aid and Method," filed on Aug. 16, 2000, which is incorporated herein by reference in its entirety. In some embodiments, barium silicate is a particularly preferred dopant because of its effectiveness in lowering the sintering temperature, amongst other reasons.

The composition generally includes the fifth dopant (e.g., silicate-based compounds) in a concentration that sufficiently reduces the sintering temperature. In some preferred embodiments, the concentration of the silicate-based compound (not element) in the composition is between about 0.50% and about 5.0% of the total weight of the composition; and, in some cases, between about 1.0% and about 1.75% of the total weight of the composition. In some embodiments, it may be preferred to use relative low concentrations of the silicate compound. For example, in some preferred embodiments, the concentration of the silicate-based compound in the composition is less than about 1.75% of the total weight of the composition (e.g., about 1.5% by weight), or less than about 1.35% of the total weight of the composition. The weight percentages described herein are particularly preferred when silicate-based compound is barium silicate.

A preferred dielectric composition is formed of barium titanate ($BaTiO_3$) and the following dopants (weight percentages are based on the total weight of the composition): between about 0.10% and about 2.5% yttrium; between about 0.01% and about 0.20% manganese; 0.01% and about 0.50% magnesium; 0.01% and about 0.20% molybdenum; and, 0.50% and about 5.0% barium silicate.

It should be understood that, in some cases, the dielectric compositions may only include the dopants described herein and no other dopants. Although, in other cases, the dielectric compositions may include other dopants in addition to those described herein. In some embodiments, the dielectric compositions may not include all of the dopant described herein and/or the dopants may be present in amounts outside of the preferred ranges described herein. The dielectric compositions described above refer to pre-fired compositions prior to the formation of dielectric layers. However, it should be understood that dielectric layers (post firing) formed from the dielectric compositions described herein also include the same compounds and, typically, in the same concentrations (based on the total weight of the dielectric composition). In many cases, dielectric layers also include additional components which have been added to the dielectric composition.

The dopants may be added to the dielectric composition in different forms. In some cases, dopant compounds are coated onto surfaces of the barium titanate-based particles. Typically, when present as coatings on barium titanate-based particles, the dopant compounds are metal hydroxides or metal hydrous oxides. It should be understood that the metal hydroxides or metal hydrous oxides may be converted into metal oxides when the composition is fired during processing to form a dielectric layer. In other embodiments, dopant compounds are added as particles which are mixed with the barium titanate-based particles. Typically, when present as particles, the dopant compounds are metal oxides. In some cases, certain dopant compounds may be coatings, while other dopant compounds may be particles.

When provided as coatings, the barium titanate-based particles are coated with a sufficient thickness to obtain the desired dopant concentration. Dopant coating thicknesses, for example, can be between about 0.1 nm and about 10 nm. In certain embodiments, it may be desirable to form a coating over the entire particle surface. In other embodiments, particularly when small dopant weight percentages are desired, the coating may cover only a portion of the particle surface. A minority amount of the barium titanate-based particles in the dielectric composition may not be coated at all.

In some cases, the different dopant compounds are coated successively to form a series of chemically distinct layers. In one set of preferred embodiments, a barium silicate dopant compound is provided as the innermost coating layer on the particles. In another set of preferred embodiments, the barium titanate-based particles are coated in succession (i.e., from innermost layer to outermost layer) with a barium silicate compound, a molybdenum compound, a magnesium compound, a manganese compound, and a yttrium compound.

Any suitable coating technique known in the art may be used to form dopant coatings on the barium titanate-based particles. In certain embodiments, a precipitation technique may be preferred. Suitable precipitation techniques have been described, for example, in commonly-owned, co-pending U.S. patent application Ser. No. 08/923,680, entitled "Dispersible, Metal Oxide Coated, Barium Titanate Materials," filed Sep. 4, 1997, which is incorporated herein by reference in its entirety.

In one exemplary precipitation technique, the barium titanate-based particles are dispersed in a fluid medium (e.g., an aqueous medium) to form a slurry prior to the coating process. The barium titanate-based particles, for example, are present in amounts between about 5 and about 50 weight percent based on the total weight of the slurry. In many cases, the pH of the slurry is maintained at greater than 7 to aid in the precipitation. The coating process involves adding suitable solutions containing ionic species which are capable of reacting to form the desired dopant compound. The reaction causes the compound to precipitate from the slurry as a coating on the ceramic particle surfaces because the energy required to nucleate the compound is minimized at particle surfaces. Successive coatings may be provided by repeating the process. Particles may be washed between successive coating steps to remove contaminants.

When provided as particles, the dopant compounds are added in an amount sufficient to obtain the desired concentration in the dielectric composition. The dopant particles are typically mixed with the barium titanate-based particles using conventional techniques (e.g., milling) to ensure that a homogeneous mixture is present.

The dielectric compositions which include the dopant compounds (in either or both forms) may be further processed to form dielectric layers in electronic devices, such as MLCCs. Such processing techniques are known in the art. One exemplary technique is described herein. The dielectric composition is dispersed to form a slurry to which dispersants and binders are added to form a castable slip. The slip is cast to form a "green" layer of dielectric material. An electrode paste including an electrode composition and a liquid carrier is spread on the green layer. Additional green layers and electrode layers are stacked to form a laminate of alternating green ceramic dielectric and electrode layers. The stacks are diced into MLCC-sized cubes. The cubes are heated to burn off organic materials, such as binders and dispersants. Then, the cubes are fired to sinter the particles of the dielectric composition to form dense dielectric layers, thus, forming the capacitor structure. It should be understood that other techniques known in the art may also be used and that other electronic devices than MLCCs may be produced.

The dielectric composition is particularly well-suited to form dielectric layers in electronic devices having base metal electrodes. Base metal electrodes include nickel electrodes and copper electrodes. As described above, the dielectric composition includes reduction resistance dopants which decrease the tendency of the dielectric composition from being reduced when fired in the reducing atmospheres used to sinter MLCCs that include base metal electrodes. Thus, the dielectric composition is particularly compatible with base metal electrodes.

As described above, the dielectric compositions of the invention may include a number of different dopants. The particular combination of dopants and their respective concentrations may be determined by the requirements of the particular application. The dopant types and concentrations described herein provide compositions having desirable electrical properties. In preferred cases, the dielectric compositions are used to form dielectric layers of MLCCs that satisfy X7R and/or X5R requirements. It should be understood that the composition may be tailored for a specific application, for example, by adjusting the concentration of one of the dopants to enhance a particular property (sometimes at the expense of another property) as desired.

The electrical properties of MLCCs including dielectric layers made from the dielectric compositions described herein depend, at least in part, on other characteristics of the MLCCs. These other characteristics include the MLCC geometry (e.g., thickness and area), number of dielectric/electrode layers, sintering conditions, and density of the sintered dielectric layers, amongst others. It is generally desirable for the MLCCs including dielectric layers made from the dielectric compositions described herein to have one or more of the following characteristics: a dielectric constant of at least 2300; a dissipation factor at 25° C. of less than 1%; and, a capacitance at −55° C. and at 125° C. that varies less than +/−15% from the capacitance at 25° C.

The present invention will be further illustrated by the following examples, which are intended to be illustrative in nature and are not to be considered as limiting the scope of the invention.

EXAMPLE 1

The electrical properties of different dielectric compositions of the present invention are characterized. The dielectric compositions include different dopant concentrations within the preferred ranges described herein. The examples show the effect of dopant concentration on electrical properties and how compositions may be tailored to meet requirements of specific applications.

The compositions were produced using the same general procedure. Barium titanate particles were produced in a hydrothermal process. The particles had an average primary particle size of about 0.2 micron. The particles were subjected to a heat treatment step (1000° C. for about 2 hours) which increased the primary particle size to about 0.4 micron.

About 125 g of the particles were slurried in an aqueous medium. A precipitation process was used to sequentially coat the particles with the respective dopant compounds. The resulting particles had coatings formed of a series of chemically distinct layers including (from innermost to outermost): barium silicate, magnesium oxide, barium molybdate, manganese oxide, and yttrium oxide. The precipitation process was controlled to produce compositions having the desired concentrations of dopants.

The coated particles were filtered, washed, and dried. A binder solution containing ethylene glycol and isopropanol (30 weight percent binder) was added to the coated particles to form a mixture which was pressed into a ½ inch diameter disc. The discs were fired at 1350° C. to form sintered discs having a diameter of about 10 mm and a thickness of about 2 mm. Gold was sputtered onto the top and bottom surface of the sintered discs to form conductive electrode layers.

Electrical properties of the sintered discs were measured using an impedance analyzer (HP-4192A) at 1 Vrms and 1 kHZ. The measured properties included the dielectric constant (k) at 25° C., the dissipation factor (D.F.) at 25° C., capacitance stability at 125° C., and capacitance stability at −55° C.

The dielectric compositions and their electrical properties are summarized in Table 1 below.

TABLE 1

| Comp. # | $BaSiO_3$ | Mn | Mg | Y | Mo | TC @ 125C | K @ 25C | DF @ 25C | TC @ −55C |
|---|---|---|---|---|---|---|---|---|---|
| 1 | 1.520 | 0.050 | 0.150 | 1.000 | 0.100 | −1.59 | 2249 | 0.27 | −12.92 |
| 2 | 1.748 | 0.050 | 0.150 | 1.000 | 0.100 | 6.39 | 2367 | 0.49 | −15.05 |
| 3 | 1.900 | 0.050 | 0.150 | 1.000 | 0.100 | 5.09 | 2282 | 0.43 | −14.46 |
| 4 | 1.748 | 0.050 | 0.100 | 1.000 | 0.100 | 9.51 | 2462 | 0.68 | −21.80 |
| 5 | 1.748 | 0.050 | 0.200 | 1.000 | 0.100 | −3.62 | 2448 | 1.21 | −15.19 |
| 6 | 1.748 | 0.050 | 0.150 | 0.800 | 0.100 | 4.78 | 2458 | 0.91 | −17.25 |
| 7 | 1.748 | 0.050 | 0.150 | 1.200 | 0.100 | 5.28 | 2130 | 1.02 | −13.45 |
| 8 | 1.748 | 0.050 | 0.150 | 1.000 | 0.050 | 14.06 | 1967 | 1.13 | −17.19 |
| 9 | 1.748 | 0.050 | 0.150 | 1.000 | 0.150 | 5.37 | 1872 | 0.71 | −11.00 |
| 10 | 2.090 | 0.075 | 0.100 | 1.200 | 0.050 | 12.26 | 2116 | 0.51 | −17.67 |
| 11 | 1.710 | 0.050 | 0.150 | 1.000 | 0.100 | 4.11 | 2837 | 0.61 | −21.20 |
| 12 | 2.090 | 0.025 | 0.100 | 1.200 | 0.150 | 6.31 | 2308 | 0.67 | −16.65 |
| 13 | 2.090 | 0.075 | 0.100 | 0.800 | 0.150 | 14.36 | 2347 | 0.53 | −21.17 |
| 14 | 2.090 | 0.075 | 0.200 | 0.800 | 0.050 | 7.30 | 2190 | 0.33 | −13.23 |
| 15 | 1.330 | 0.025 | 0.100 | 0.800 | 0.150 | 9.06 | 2991 | 1.21 | −24.90 |
| 16 | 1.330 | 0.025 | 0.100 | 1.200 | 0.050 | 8.29 | 2152 | 0.50 | −14.12 |
| 17 | 2.090 | 0.025 | 0.200 | 1.200 | 0.050 | 5.18 | 2236 | 0.59 | −13.07 |
| 18 | 1.330 | 0.075 | 0.200 | 1.200 | 0.050 | 7.16 | 2135 | 0.65 | −10.46 |
| 19 | 2.090 | 0.075 | 0.200 | 1.200 | 0.150 | 7.05 | 2011 | 0.32 | −11.02 |
| 20 | 1.330 | 0.075 | 0.100 | 0.800 | 0.050 | 15.71 | 2603 | 0.21 | −21.69 |
| 21 | 1.330 | 0.075 | 0.100 | 1.200 | 0.150 | 11.68 | 2005 | 0.15 | −12.59 |
| 22 | 2.090 | 0.025 | 0.100 | 0.800 | 0.050 | 12.21 | 2729 | 1.06 | −24.16 |
| 23 | 1.330 | 0.075 | 0.200 | 0.800 | 0.150 | 4.22 | 2729 | 0.44 | −14.39 |
| 24 | 2.090 | 0.025 | 0.200 | 0.800 | 0.150 | 0.67 | 2683 | 0.57 | −14.49 |
| 25 | 1.330 | 0.025 | 0.200 | 0.800 | 0.050 | 0.43 | 2849 | 0.63 | −16.26 |
| 26 | 1.330 | 0.025 | 0.200 | 1.200 | 0.150 | 5.8 | 2163 | 0.5 | −10.4 |

It should be understood that MLCCs including dielectric layers formed from the same dielectric compositions in Table 1 would be expected to have different electrical properties due to differences (e.g., thickness, geometry, numbers of dielectric layers, etc.) between MLCCs and the sintered discs.

The different electrical properties of the compositions (1–26) result from different dopant concentrations. All of the dielectric compositions have good electrical properties, though the best composition for a given application depends upon the desired properties e.g., high dielectric constant, low dissipation factor, combinations thereof, etc.). In some applications, the value of one property may be most important, while other applications require a good balance of properties. In applications that require a high dielectric constant, composition #23 may be preferred. In applications that require a low dissipation factor, composition #21 may be preferred. In applications that require a good balance of properties, composition #2 may be preferred.

The examples show that dopant concentrations may be varied within relatively narrow ranges to provide compositions having different property enhancements.

EXAMPLE 2

This example compares electrical properties of a dielectric composition of the present invention to a comparative dielectric composition used to form dielectric layers in MLCCs.

The comparative dielectric composition includes barium titanate particles and several dopant compounds. Sintered discs of the comparative dielectric composition were prepared as described in Example 1. Electrical properties of the sintered discs were measured as described in Example 1. The measured properties included the dielectric constant (K), the dissipation factor, and the capacitance temperature stability. Each property was measured between −55° C. and 125° C. The same properties were measured using sintered discs formed from dielectric composition #23 described in Example 1.

Figure 2:
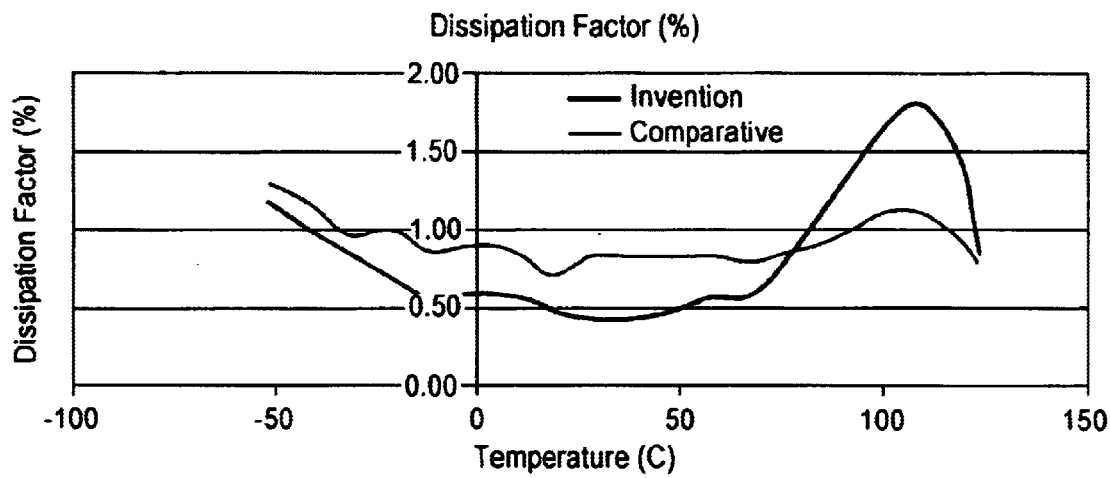
FIG. 2 is a graph comparing the dissipation factor of a dielectric composition according to one embodiment of the present invention to a comparative dielectric composition.
Figure 3:
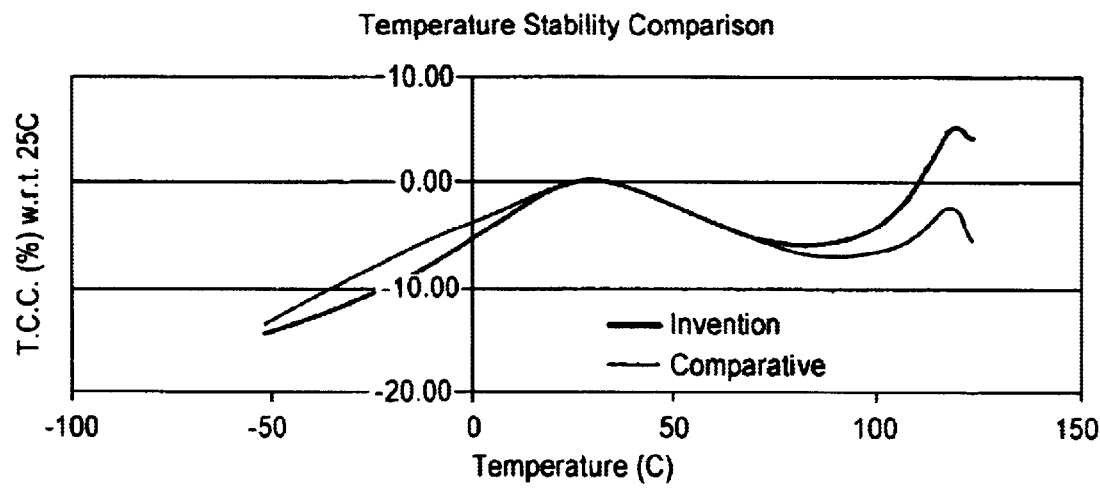
FIG. 3 is a graph comparing the temperature stability of the capacitance of a dielectric composition according to one embodiment of the present invention to a comparative dielectric composition.

FIGS. 1–3 compare electrical properties of dielectric composition #23 to the comparative dielectric composition.

FIG. 1 shows that dielectric composition #23 has a higher dielectric constant over the entire temperature range. Higher dielectric constants are generally advantageous in MLCC applications.

FIG. 2 shows that dielectric composition #23 has a lower dissipation factor than the comparative dielectric composition over a majority of the temperature range. In particular, the dissipation factor at −55° C. of dielectric composition #23 is lower than the comparative dielectric composition, and at 125° C. the dissipation factor of dielectric composition #23 is similar to the comparative dielectric composition. Lower dissipation factors are generally advantageous in MLCC applications. Also, dielectric composition #23 has a dissipation factor that satisfies X7R (less than 3.5% at 1.0 Vrms) and X5R specifications (less than 5.0% at 1.0 Vrms).

FIG. 3 shows that dielectric composition #23 has a lower or similar capacitance stability over a majority of the temperature range. Lower capacitance stability is generally advantageous in MLCC applications. In particular, the capacitance stability of dielectric composition #23 is within X7R specifications (a capacitance at −55° C. and at 125° C. that varies less than +/−15% from the capacitance at 25° C.) and X5R specifications (a capacitance at −55° C. and at 85° C. that varies less than +/−15% from the capacitance at 25° C.).

This example shows that a dielectric composition of the present invention has better electrical properties than a comparative dielectric composition used to form dielectric layers in MLCCs. In particular, the dielectric composition of the present invention satisfies X7R and X5R requirements.

It should be understood that although particular embodiments and examples of the invention have been described in detail for purposes of illustration, various changes and modifications may be made without departing from the scope and spirit of the invention. Accordingly, the invention is not to be limited except as by the appended claims.

What is claimed is:

1. A dielectric composition comprising:
   a barium titanate-based material;
   a rare earth metal compound;
   a manganese compound;
   an alkaline earth metal compound;
   a hexavalent metal compound; and
   a silicate-based compound,
   wherein the barium titanate-based material comprises barium titanate-based particles and the barium titanate-based particles have a coating comprising at least one of the compounds.

2. The dielectric composition of claim E wherein the rare earth metal compound comprises yttrium.

3. The dielectric composition of claim 2, wherein the rare earth metal compound comprises yttrium oxide or yttrium hydroxide.

4. The dielectric composition of claim 1, wherein the barium titanate-based material comprises barium titanate-based particles, the barium titanate-based particles having a coating comprising the rare earth metal compound.

5. The dielectric composition of claim 1, wherein the rare earth metal comprises between about 0.10% and about 2.5% of the total weight of the dielectric composition.

6. The dielectric composition of claim 5, wherein the rare earth metal comprises about 0.80% of the total weight of the dielectric composition.

7. The dielectric composition of claim 1, wherein the manganese compound comprises manganese oxide or manganese hydroxide.

8. The dielectric composition of claim 1, wherein the barium titanate-based material comprises barium titanate-based particles, the barium titanate-based particles having a coating comprising the manganese compound.

9. The dielectric composition of claim 1, wherein manganese comprises between about 0.01% and about 0.20% of the total weight of the dielectric composition.

10. The dielectric composition of claim 9, wherein the rare earth metal comprises about 0.05% of the total weight of the dielectric composition.

11. The dielectric composition of claim 1, wherein the alkaline earth metal compound comprises magnesium.

12. The dielectric composition of claim 11, wherein the rare earth metal compound comprises magnesium oxide or magnesium hydroxide.

13. The dielectric composition of claim 1, wherein the barium titanate-based material comprises barium titanate-based particles, the barium titanate-based particles having a coating comprising the alkaline earth metal compound.

14. The dielectric composition of claim 1, wherein the alkaline earth metal comprises between about 0.01% end about 0.50% of the total weight of the dielectric composition.

15. The dielectric composition of claim 14, wherein the alkaline earth metal comprises about 0.10% of the total weight of the dielectric composition.

16. The dielectric composition of claim 1, wherein the hexavalent metal compound comprises molybdenum.

17. The dielectric composition of claim 16, wherein the hexavalent metal compound comprises molybdenum oxide or molybdenum hydroxide.

18. The dielectric composition of claim 1, wherein the barium titanate-based material comprises barium titanate-based particles, the barium titanate-based particles having a coating comprising the hexavalent metal compound.

19. The dielectric composition of claim 1, wherein the hexavalent metal compound comprises between about 0.01% and about 0.20% of to total weight of the dielectric composition.

20. The dielectric composition of claim 19, wherein the hexavalent metal compound comprises about 0.05% of the total weight of the dielectric composition.

21. The dielectric composition of claim 1, wherein the silicate-based compound comprises barium silicate.

22. The dielectric composition of claim 1, wherein the barium titanate-based material comprises barium titanate-based particles, the barium titanate-based particles having a coating comprising barium silicate.

23. The dielectric composition of claim 1, wherein the silicate-based compound comprises between about 0.50% and about 5.0% of the total weight of the dielectric composition.

24. The dielectric composition of claim 1, wherein the silicate-based compound comprises less than about 1.75% of the total weight of the dielectric composition.

25. The dielectric composition of claim 1, wherein the silicate-based compound comprises less than about 1.35% of the total weight of the dielectric composition.

26. The dielectric composition of claim 1, wherein the barium titanate-based material comprises barium titanate.

27. The dielectric composition of claim 1, wherein the barium titanate-based material comprises particles having an average primary particle size of less than 0.5 micron.

28. The dielectric composition of claim 1, wherein the dielectric composition satisfies X5R specifications.

29. The dielectric composition of claim 1, wherein the dielectric composition satisfies X7R specifications.

30. A dielectric composition comprising:
    barium titanate particles having a coating;
    yttrium comprising between about 0.10% and about 2.5% of the total weight of the dielectric composition;
    manganese comprising between about 0.01% and about 0.20% of the total weight of the dielectric composition;
    magnesium comprising between about 0.01% and about 0.50% of the total weight of the dielectric composition;
    molybdenum comprising between about 0.01% and about 0.20% of the total weight of the dielectric composition; and
    barium silicate comprising between about 0.50% and about 5.0% of the total weight of the dielectric composition.

31. A dielectric composition comprising barium titanate-based particles, the barium titanate-based particles having a coating comprising a rare earth metal compound, a manganese compound, an alkaline earth metal compound, a hexavalent metal compound, and a silicate-based compound.

32. The dielectric composition of claim 31, wherein the coating includes a plurality of chemically distinct layers.

33. A method of forming a dielectric composition comprising:
    forming a coating on barium titanate-based particles, the coating comprising a rare earth metal compound, a manganese compound, an alkaline earth metal compound, a hexavalent metal compound, and a silicate-based compound.

34. The method of claim 33, wherein the rare earth metal compound comprises yttrium.

35. The method of claim 33, wherein the rare earth metal comprises between about 0.10 percent and about 2.5 percent of the total weight of the dielectric composition.

36. The method of claim 33, wherein manganese comprises between about 0.10 percent and about 0.20 percent of the total weight of the dielectric composition.

37. The method of claim 33, wherein the alkaline earth metal compound comprises magnesium.

38. The method of claim 33, wherein the alkaline earth metal comprises between about 0.01 percent and about 0.50 percent of the total weight of the dielectric composition.

39. The method of claim 33, wherein the hexavalent metal compound comprises molybdenum.

40. The method of claim 33, wherein the hexavalent metal compound comprises between about 0.01 percent and about 0.20 percent of the total weight of the dielectric composition.

41. The method of claim 33, wherein the silicate-based compound comprises barium silicate.

42. The method of claim 33, wherein the silicate-based compound comprises between about 0.50 percent and about 5.0 percent of the total weight of the dielectric composition.

43. The method of claim 33, wherein the barium titanate-based particles are barium titanate particles.

* * * * *